Patented Nov. 10, 1953

2,658,818

UNITED STATES PATENT OFFICE 2,658,818

STABILIZED HYDROGEN PEROXIDE AND METHOD OF MAKING SAME

Edward S. Shanley, Grand Island, and Hans O. Kauffmann, Eggertsville, N. Y., assignors to Buffalo Electro-Chemical Company, Inc., Tonawanda, N. Y.

No Drawing. Application October 5, 1945, Serial No. 620,626

5 Claims. (Cl. 23—207.5)

The present invention relates to an improvement in methods of stabilizing hydrogen peroxide solutions, to an improved stabilized aqueous hydrogen peroxide and, in particular, to the employment of colloidally dispersed metallic tin as the stabilizing material.

Hydrogen peroxide is an important article of commerce the use of which, in industry, is increasing year by year. Heretofore, hydrogen peroxide was shipped in small quantities in glass carboys. Presently, however, hydrogen peroxide is shipped in tank cars and stored in substantial quantities at distribution centers or at the locality of use. Due to this method of shipping and storage, there is a continual demand that the hydrogen peroxide be of somewhat higher stability than that furnished in the past; that is to say, that it resist the decomposing action of heat and light to a greater degree and that the product be capable of storage over long periods of time without deterioration in strength.

Aqueous solutions of hydrogen peroxide are available as articles of commerce and, in general, the standard 100 volume hydrogen peroxide, about 27.5% hydrogen peroxide by weight, is generally stabilized by adding stabilizing chemicals thereto, which chemicals may be present from about 500 to 1250 milligrams per liter, more or less. Hydrogen peroxide is now employed in many processes where residues of this amount and character are undesirable.

It is an object of the present invention to stabilize hydrogen peroxide solutions by the employment of extremely small amounts of a stabilizing agent, an agent which does not interfere with the uses to which hydrogen peroxide is put and in amounts which do not interfere with the sensitive reactions into which the peroxide enters.

It is a further object of the invention to stabilize acid or neutral hydrogen peroxide with very small amounts of colloidally dispersed metallic tin.

In accordance with the invention, a dispersion of metallic tin may be prepared, in accordance with the procedure of Bredig, by forming an electric arc between tin electrodes under distilled water and permitting arcing to continue for a time sufficient to produce a tin sol. After standing several days, coarse particles of tin torn from the electrodes, by the disruptive action of the arc, were removed and the colloidal suspension analyzed gravimetrically and found to contain 460 milligrams of metallic tin per liter. In order to determine the stabilizing effect of this colloidal dispersion of tin, samples of redistilled 30% hydrogen peroxide, containing a very small amount of residue and no added stabilizing material, were treated with sufficient of the aqueous colloidal solution of tin so as to contain 2 milligrams per liter of tin in one sample, and 20 milligrams per liter of tin in another sample, i. e., approximately 2 p. p. m. and 20 p. p. m. respectively. The samples of peroxide so treated were subjected to an accelerated decomposition or stability test by placing them in a water bath at 100° C. for 24 hours and, at the end of that period, determining the amount of active oxygen lost by decomposition. Measured samples of the untreated and of the treated peroxide were titrated in the regular way with N/10 permanganate and the loss calculated. The results were as outlined in Table I.

TABLE I

| Sample | Percent Loss of Active Oxygen in 24 hrs. at 100° C. |
|---|---|
| Untreated 30% redistilled peroxide | 21.1 |
| 30% redistilled peroxide plus 2 p. p. m. tin | 1.6 |
| 30% redistilled peroxide plus 20 p. p. m. tin | 2.1 |

It will be seen from the above table that in 24 hours the unstabilized hydrogen peroxide lost 21.1% of its active oxygen when heated at 100° C. This is in contrast with the peroxides stabilized with colloidal tin wherein the loss, after 24 hours, was about $\frac{1}{10}$ that of the untreated sample. It will be noted that amounts of tin so small as 2 parts per million is sufficient to effect an enormous stabilizing action upon unstabilized hydrogen peroxide.

In order to determine the effect of an aqueous colloidal dispersion of tin upon so-called commercial hydrogen peroxide, a sample of commercial 30% hydrogen peroxide of relatively low purity was obtained and portions thereof treated with the aqueous dispersion of tin. To one sample there was added sufficient of the tin sol to produce a peroxide containing 2 parts per million of tin and, in another sample, 20 parts per million of tin. The untreated commercial hydrogen peroxide and the treated peroxide were subjected to the accelerated decomposition test by heating in the water bath for 24 hours. Thereafter, the various samples were tested for their hydrogen peroxide and the amount of active oxygen loss during the heating period was determined. The results of this test are set forth in Table II as follows:

TABLE II

| Sample | Percent Loss of Active Oxygen in 24 hrs. at 100° C. |
|---|---|
| Untreated commercial 30% peroxide | 48.6 |
| Commercial 30% hydrogen peroxide plus 2 p. p. m. tin | 21.9 |
| Commercial 30% hydrogen peroxide plus 20 p. p. m. tin | 3.5 |

Whereas in the relatively pure product treated as set forth in Table I, substantially equivalent stability was obtained with 2 parts per million of tin or with 20 parts per million of tin, the commercial hydrogen peroxide which had not been redistilled possessed better stability in the presence of 20 parts per million of tin than it did when treated with 2 parts per million of tin.

In accordance with the present invention, it has been found that the amount of tin required to stabilize the hydrogen peroxide depends upon the initial degree of impurity of the peroxide to be stabilized and, in general, larger amounts of colloidal tin are required, the higher the initial impurity. In general, the amount of colloidal tin, based on the aqueous hydrogen peroxide, will not exceed about 50 to 100 parts per million of tin and, in many instances, addition of 20 to 50 parts per million will be found sufficient to stabilize the usual commercial grade of hydrogen peroxide. In general, a somewhat greater stabilizing action is obtained, the higher the concentration of colloidal tin. However, at every high concentration as, for instance, 100 parts per million of tin, a slight turbidity is created in the peroxide solution. The colloidal tin may be used advantageously on all types of commercial hydrogen peroxide within the pH range of from pH 2.5 to 7.

Although it is best to prepare the tin sol in distilled water and add predetermined amounts of the sol to the peroxide to be stabilized, a colloidal dispersion of tin may be prepared directly in the peroxide solution by striking an arc between pure tin electrodes immersed in the hydrogen peroxide to be stabilized. As an example, tin electrodes were immersed in a solution of unstabilized 30% hydrogen peroxide and arcing obtained from the usual 110 volt source. Arcing was continued until the hydrogen peroxide became turbid whereupon arcing was stopped and coarse particles of metallic tin permitted to settle out by standing for 24 hours. The resulting hydrogen peroxide possessed a very faint brown turbidity, and stability tests were made on the so treated hydrogen peroxide and upon an untreated sample of the original unstabilized 30% hydrogen peroxide. The results of these tests are set forth in Table III.

TABLE III

| Sample | Percent Loss of Active Oxygen in 24 hrs. at 100° C. |
|---|---|
| Untreated 30% peroxide | 77.0 |
| 30% peroxide with tin sol | 1.5 |

In general, greater control is possible by first preparing an aqueous dispersion of colloidal tin and using such solution as the stabilizing agent for the peroxide rather than producing the colloidal tin directly by arcing within the peroxide solution. Where the latter method is used, the resulting peroxide is generally turbid and generally contains more tin than that required to produce a given stability.

Although dependable results of stability are obtainable from accelerated decomposition tests of hydrogen peroxide, the various samples tested as above were also permitted to stand in glass over a period of 112 days and tested periodically for active oxygen content. The samples were stored at 45° C., a temperature considerably higher than that to which commercial hydrogen peroxide is subjected in normal transportation and storage conditions.

The samples outlined in Table I, when permitted to stand for 112 days at 45° C., gave the following results when titrated to determine the loss in active oxygen:

TABLE IV

| Sample | Percent Loss of Active Oxygen in 112 days |
|---|---|
| Untreated 30% redistilled peroxide | 100 (70 days) |
| 30% redistilled peroxide plus 2 p. p. m tin | 1.9 |
| 30% redistilled peroxide plus 20 p. p. m. tin | 0.8 |

The samples listed in Table II were permitted to stand at 45° C. and were tested periodically for 112 days with the following result:

TABLE V

| Sample | Percent Loss of Active Oxygen in 112 days |
|---|---|
| Untreated commercial 30% peroxide | 74 |
| Commercial 30% peroxide plus 2 p. p. m. tin | 57 |
| Commercial 30% peroxide plus 20 p. p. m. tin | 8.7 |

The stabilizing action of colloidal tin is just as effective upon concentrated peroxide solutions as upon dilute solutions. An aqueous solution of peroxide containing 90% hydrogen peroxide was treated with 2 p. p. m. tin. An aliquot portion of the so treated solution was heated in the water bath for 24 hours in an accelerated decomposition test while another aliquot was permitted to stand at 45° C. for 112 days. Even so little tin as 2 parts per million gave remarkable stability to the sample:

TABLE VI

| Sample | Percent Loss in 24 hrs. at 110° C. | Percent Loss 112 days at 45° C. |
|---|---|---|
| Untreated 90% hydrogen peroxide | 26.3 | 29 |
| 90% hydrogen peroxide plus 2 p. p. m. tin | 5.6 | 3.3 |

It will be understood that the above examples are merely illustrative of the practice of the invention and are not to be deemed limitative thereof since there are many variations of the invention, the scope of which is defined in the claims appended hereto.

What is claimed is:

1. An aqueous solution of commercial hydrogen peroxide containing colloidally dispersed metallic tin.

2. An aqueous solution of commercial hydrogen peroxide containing colloidally dispersed metallic tin in amounts sufficient to increase the stability of the original peroxide.

3. An aqueous solution of commercial hydrogen peroxide containing colloidally dispersed metallic tin in amounts greater than two milligrams per liter.

4. The method of stabilizing an aqueous hydrogen peroxide solution which comprises dispersing colloidal metallic tin therein.

5. The method of stabilizing an aqueous hydrogen peroxide solution which comprises adding colloidal metallic tin in amounts at least equal to 2 parts per million based on the aqueous peroxide.

EDWARD S. SHANLEY.
HANS O. KAUFFMANN.

References Cited in the file of this patent

UNITED STATES PATENTS

| Number | Name | Date |
|---|---|---|
| 1,213,921 | Liebknect et al. | Jan. 30, 1917 |
| 1,536,213 | Halvorsen | May 5, 1925 |
| 1,958,204 | Reichert | May 8, 1934 |

FOREIGN PATENTS

| Number | Country | Date |
|---|---|---|
| 233,856 | Germany | June 4, 1910 |

OTHER REFERENCES

Mellor, "Inorganic and Theoretical Chemistry," 1922, vol. I, pp. 936–937.

Bancroft, "Applied Colloid Chemistry," 2nd Edition, 1926. Page 214.